J. W. PARKIN.
CARBURETER.
APPLICATION FILED APR. 9, 1913.
1,120,845.
Patented Dec. 15, 1914.
2 SHEETS—SHEET 1.
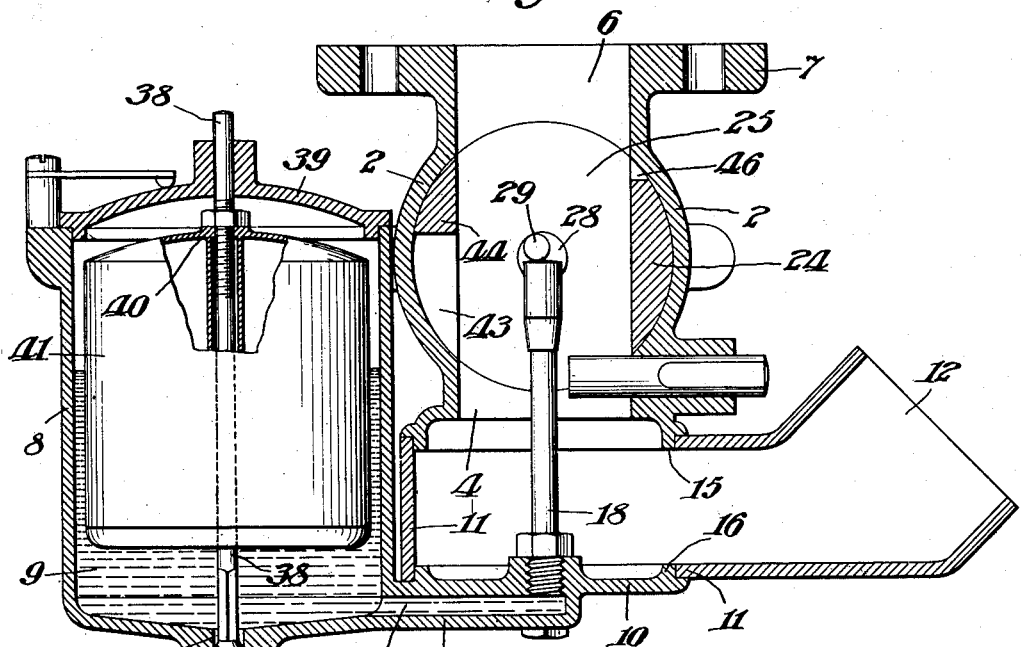
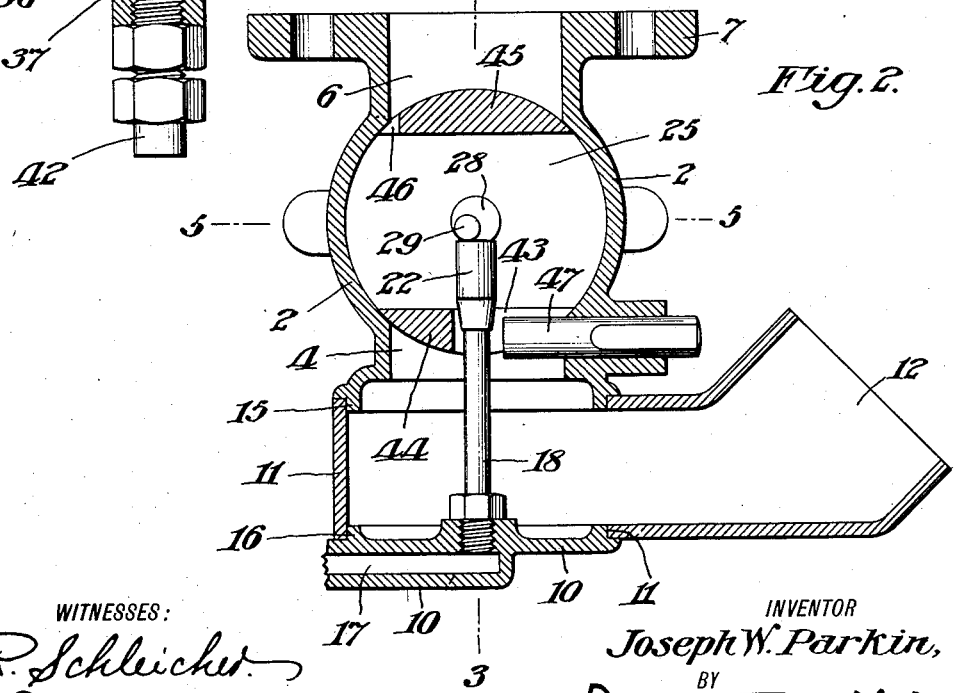
WITNESSES:
R. Schleicher
G. P. Sharkey
INVENTOR
Joseph W. Parkin,
BY
ATTORNEY

J. W. PARKIN.
CARBURETER.
APPLICATION FILED APR. 9, 1913.

1,120,845.

Patented Dec. 15, 1914.

2 SHEETS—SHEET 2.

WITNESSES:
R. Schleicher
G. P. Sharkey

INVENTOR
Joseph W. Parkin,
BY
A. V. Groupp
ATTORNEY.

UNITED STATES PATENT OFFICE.

JOSEPH WALTER PARKIN, OF PHILADELPHIA, PENNSYLVANIA.

CARBURETER.

1,120,845.   Specification of Letters Patent.   Patented Dec. 15, 1914.

Application filed April 9, 1913. Serial No. 759,838.

*To all whom it may concern:*

Be it known that I, JOSEPH W. PARKIN, a citizen of the United States, residing at Philadelphia, in the county of Philadelphia and State of Pennsylvania, have invented certain new and useful Improvements in Carbureters, of which the following is a specification.

My invention relates to carbureters for gas engines.

The object of the invention is to provide a carbureter of novel, simple and efficient construction wherein the valve for controlling the oil inlet and the valve for controlling the air inlet to the engine are related and operated, so that the proper mixture of vaporized oil and air may be supplied to the engine at different speeds thereof.

A further object of the invention is to construct the parts so that they may be adjusted to vary the timing of the operation of the oil inlet valve with respect to the operation of the valve for controlling the air inlet to the engine.

A further object of the invention is to provide a carbureter which will reduce the partial vacuum heretofore required in the engine to draw in the explosive charge, and thereby increase the efficiency of the engine.

A further object of the invention is to construct and arrange the parts for controlling the passage of air through the carbureter and the supply of oil thereto, so that the explosive mixture may be nicely varied in accordance with the varied speeds of the engine, to increase the efficiency of the engine, and provide for the proper supply of fuel thereto under all conditions; and a further object of my invention is to provide certain novel details of construction and arrangements of parts whereby advantages are gained; all as will be hereinafter fully described and claimed.

Figure 3:
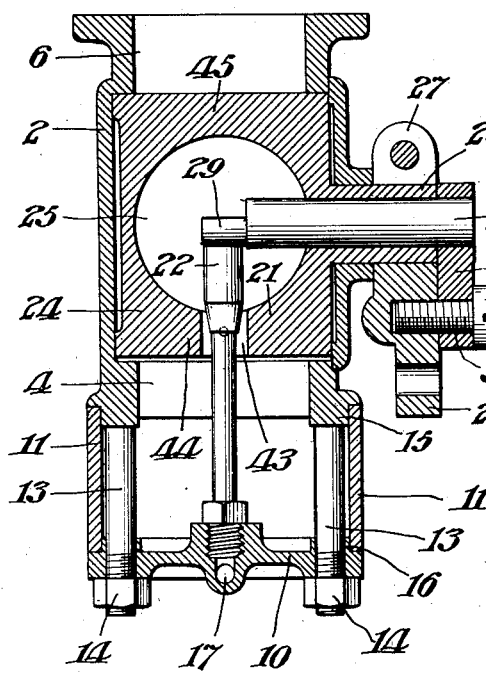
Figure 4:
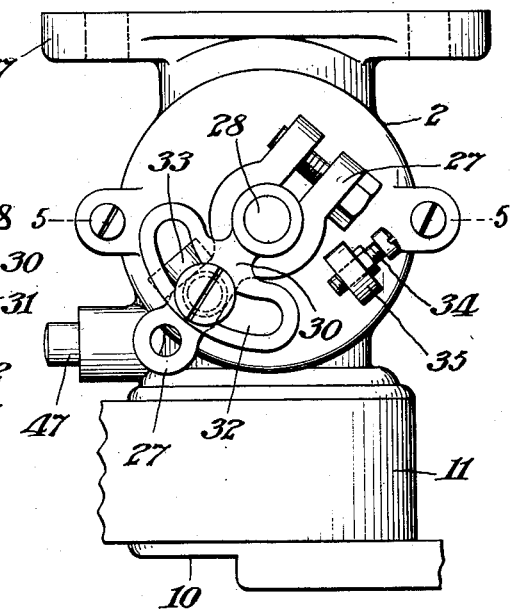
Figure 6:
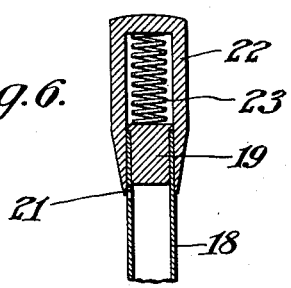
Figure 5:
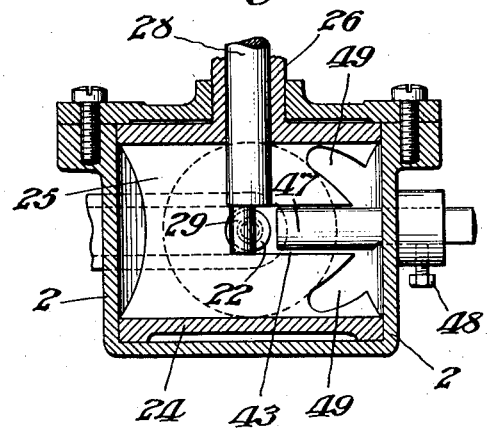

In the accompanying drawings, illustrating my invention Figure 1, is a vertical section, through my improved carbureter, showing the air controlling valve in the open position. Fig. 2, is a vertical section of parts of the carbureter, showing the air controlling valve in the closed position. Fig. 3, is a vertical section of the device, on line 3—3 of Fig. 2. Fig. 4, is a side elevation of a portion of the carbureter. Fig. 5, is a horizontal section, on line 5—5 of Fig. 4. Fig. 6, is an enlarged vertical section through the oil supply pipe and the controlling valve therefor.

Referring to the drawings, 2 designates a casing which incloses a carbureting chamber for the air and vaporized oil and having an inlet opening 4 and an outlet opening 6. The top of the casing 2 is provided with a flange 7 by means of which the casing 2 may be secured to an engine with the carbureter outlet opening 6 in communication with the inlet passageway or passageway of the engine, through which the explosive mixture is drawn.

Adjacent the casing 2 is a casing 8 inclosing an oil chamber 9 and having a part 10 projecting beneath the casing 2 and beneath a head 11 on the inner end of an air inlet pipe 12 having its outer end open and its inner end communicating with the inlet opening 4 of the carbureting chamber, as shown. The head 11 on the air inlet pipe is located between and engaged by the bottom of the casing 2 and the top of the projection 10, and the head 11 is clamped therebetween by a pair of bolts 13 fixed to and extending downwardly from the casing 2 and through openings in the projection 10 and having nuts 14 on their lower ends screwed into engagement with the bottom of the projection 10. The bottom of the casing 2 is provided with a downwardly-extending annular flange 15 fitted to a circular opening in the top of the head 11, and the projection 10 is provided with an upwardly extending annular flange 16 and fitted to a circular opening in the bottom of the head 11, so that when the nuts 14 are loosened, the pipe 12 may be adjusted circularly about the casing 2 to meet various requirements in applying the carbureter to engines of various types.

The oil in passing from the chamber 9 to the carbureting chamber inclosed by the casing 2, passes first through a horizontal passageway 17 formed in the projection 10 and then through a vertically-arranged pipe 18 having its lower end screwed into the projection 10 and communicating with the passageway 17. The upper end of the pipe 18 extends into the carbureting chamber inclosed by the casing 2 and is closed by a suitable cap or head 19. Just below the head 19, the pipe is provided with an outlet passageway or opening 21 for the discharge of oil into the mixing chamber. The passageway 21 is adapted to be closed or partially closed and entirely opened by a valve head 22, comprising a tubular body, closed at its upper end and surrounding and slidably fitted to the upper end of the pipe 18. The valve head 22 is forced normally upward to open the passageway 21 by a spring 23 inclosed by the head 22 and acting against the upper closed end thereof, and the cap or head 19 closing the top of the pipe 18. This valve head 22 is adapted to be depressed against the action of the spring 23 and raised by the spring to close or partially close and open the passageway 21 by means of devices and for a purpose which will be hereinafter explained.

The valve for controlling the flow of air through the carbureter comprises a cylindrical body 24 arranged within the casing 2 and fitted to turn on a horizontal axis and having a passageway 25 extending therethrough transversely to its turning axis. The passageway 25 forms a spart of the carbureting chamber inclosed by the casing 2, and the passageway 25 is substantially the same in diameter as the vertically extending inlet opening 4 and outlet opening 6 of the carbureting chamber, so that the valve 24 may be turned to the full open position, shown in Fig. 1, to bring the passageway 25 into registry with the openings 4 and 6, to permit a large volume of air to be drawn through the carbureting chamber; and so that the valve 25 may be turned to the position shown in Fig. 2 or to any position intermediate the positions shown in Figs. 1 and 2 to reduce the volume of air passing through the carbureting chamber, and thereby regulate the volume of air in accordance with the speed of the engine. The valve body 24 is provided with a stem 26 arranged on its turning axis and extending outwardly through the wall of the casing 2. The outer end of the stem has an arm 27 secured thereto by means of which the valve 24 may be turned.

When the valve 24 is moved to the position shown in Fig. 1, the valve head 22 is simultaneously moved to open the passageway 21, and when the valve 24 is moved to the position shown in Fig. 2, the valve head 22 is moved to close the passageway 21, and for this purpose I provide the following: Extending axially through the valve stem 26 is a shaft 28 the inner end of which is provided with a projection 29 extending parallel to and having its axis eccentric to the axis of the shaft 28. The top of the valve head 22 is forced into constant contact with this eccentric projection 29 by the spring 23, and the projection 29 is so arranged that when the shaft 28 and stem 26 are turned as a unit, the valves 22 and 24 may be simultaneously moved from the position shown in Fig. 1 to the position shown in Fig. 2, and back again. The outer end of the shaft 28 extends beyond the stem 26 and has an arm 30 fixed thereto which lies adjacent the arm 27 on the stem 26. The two arms 27 and 30 are secured together by a screw 31 extending through a slot 32 in the arm 30 and screwed into the arm 27, so that the stem 26 and shaft 28 will move as a unit when the arm 27 is operated. The slot 32 is arranged so that the arm 30 and shaft 28 may be adjusted about the axis of the stem 26 by loosening the screw 31, thereby permitting the position of the projection 29 with respect to the valve 24 to be changed and thereby permitting the timing of the operation of the valve 21 with respect to the movement of the valve 24 to be nicely regulated. The movement of the arm 27 and valve 24 in one direction to the position of the valve shown in Fig. 1 is limited by a stop 33 projecting from the casing 2 and adapted to engage the arm 27; and the movement of the arm 27 and valve 24 in the reverse direction to or near the position shown in Fig. 2 is limited by an adjustable screw 34 screwed into and through a projection 35 on the casing 2. By adjusting the screw 34, the limit of movement of the arm 27 and valve 24 in that direction may be nicely regulated.

The oil chamber 9 is provided with an inlet opening 36 arranged to be closed by a valve head 37 provided with a stem 38 which extends upwardly through the oil chamber 9 and out through a guide opening in the cap or cover 39 for the chamber. A portion of the stem 38 is threaded and screwed into and through a head 40 carrying a float 41 which surrounds the stem 38. The oil is supplied to the inlet opening 36 through a pipe 42 which is connected to a suitable source of oil supply; and a constant head of oil is maintained at the inlet opening 36 from said source of supply. The level of the oil within the chamber 9 and pipe 18 is maintained just below the discharge opening or passageway 20 by the automatic action of the float 41 in opening the valve 37, when the oil falls below said level, and closing the valve 37 when the oil reaches said level.

The upper portion of the oil supply pipe 18 extends into the passageway 24, and a slot 43 is cut in the wall 44 of the valve body 24 to receive the pipe 18 when the valve 24 is moved to the position shown in Fig. 2, the slot 43 being sufficiently large to permit air to pass therethrough when the parts are in this position. The wall 45 of the valve body 24 also has a slot or opening 46 cut therein to permit air to pass from the passageway 25 and through the outlet opening 6 when the parts are in the position shown in Fig. 2. To vary the opening provided by the slot 43 between the passageway 25 and air inlet pipe 12 I provide a pin 47 slidably fitted to an opening in the wall of the casing 2 and held in place by a set screw 48 and extending into the slot 43 and adjustable into and from the same.

When the engine is running idle or without a load the valves 22 and 24 are in the position shown in Fig. 2, the passageway 21 is nearly closed, oil being drawn into the mixing chamber through the passageway 21 and the slots or openings 43 and 46 permitting sufficient air to be drawn into the engine for the required mixture for slow speed. The slots or openings 43 and 46 may be varied by adjusting the pin 47 and the stop screw 34, respectively, to regulate the explosive mixture to a nicety, in accordance with the requirements of the engine.

When it is desired to run the engine at high speed with the load on, the operating arm 27 for the valves 22 and 24 is moved into engagement with the stop 33, thus moving the valves to the position shown in Fig. 1, completely opening the oil inlet passageway 21 and permitting the maximum quantity of air and oil to be drawn into the engine for the required mixture at high speed.

By adjusting the valves 22 and 24 to different positions intermediate the positions shown in Figs. 1 and 2, the engine may be run at different speeds and at all times with the mixture required in accordance with the speed.

The adjustments afforded by the set screws 31, 34 and 48 are very important as they enable me to adjust to a nicety both the quantity of oil supplied through the opening 21 and air supplied through the valve 24 for a perfect mixture when the arm 27 is against the screw 34 and the engine is running idle or without a load.

When the valve body 24 is moved to a position in which the oil port 21 is embraced by the walls of the slot 43, the area of the oil port and the area of the air passageway will both be reduced, and when the valve body 24 is moved to move the walls of the slot 43 away from the port 21, the area of the oil port and the area of the air passageway will both be increased, thereby automatically bringing the area of the oil port 21 and the area of the air passageway into proper relation to each other for the idling or high speed of the engine controlled by the carbureter.

I claim:

1. In a carbureter, a casing inclosing a carbureting chamber having an outlet opening and an air inlet opening, a cylindrical valve body mounted to turn in an opening in said casing and having a passageway extending therethrough transversely to the turning axis thereof and adapted to control said outlet opening, said passageway being included in said carbureting chamber, said valve body having a slot therein narrower than said passageway and arranged to control the quantity of air passing to the carbureting chamber in one position of the valve body, an oil supply pipe having an oil discharge port therein embraced by the walls of said slot in one position of the valve body, a valve head movable to open and close said oil discharge port, and means operative to simultaneously move said valve body and said valve head.

2. In a carbureter, a casing inclosing a carbureting chamber having an outlet opening and an air inlet opening, a cylindrical valve body mounted to turn in an opening in said casing and having a passageway extending therethrough transversely to the turning axis thereof and adapted to control said outlet opening, said passageway being included in said carbureting chamber, said valve body having a slot therein narrower than said passageway and arranged to control the quantity of air passing to the carbureting chamber in one position of the valve body, an oil supply pipe having an oil discharge port therein embraced by the walls of said slot in one position of the valve body, a valve head movable to open and close said oil discharge port, and means operative to simultaneously move said valve body and said valve head, said means including adjustable devices to vary the relative positions of said valve body and said valve head.

3. In a carbureter, a casing inclosing a carbureting chamber having an outlet opening and an air inlet opening, a cylindrical valve body mounted to turn in an opening in said casing and having a passageway extending therethrough transversely to the turning axis thereof and adapted to control said outlet opening, said passageway being included in said carbureting chamber, said valve body having a slot therein narrower than said passageway and arranged to control the quantity of air passing to the carbureting chamber in one position of the valve body, an oil supply pipe having an oil discharge port therein embraced by the walls of said slot in one position of the valve body, a valve head movable to open and close said oil discharge port, means operative to simultaneously move said valve body and said valve head, and an air obstructing member adjustable within said slot.

In testimony whereof I affix my signature in presence of two witnesses.

JOSEPH WALTER PARKIN.

Witnesses:
  S. I. HARPER,
  A. V. GROUPE.